US005247677A

United States Patent [19]

Welland et al.

[11] Patent Number: 5,247,677

[45] Date of Patent: Sep. 21, 1993

[54] STOCHASTIC PRIORITY-BASED TASK SCHEDULER

[75] Inventors: Robert V. Welland, Menlo Park; Walter R. Smith, Palo Alto, both of Calif.

[73] Assignee: Apple Computer, Inc., Cupertino, Calif.

[21] Appl. No.: 887,987

[22] Filed: May 22, 1992

[51] Int. Cl.[5] .......... G06F 9/40

[52] U.S. Cl. .......... 395/650; 364/DIG. 1

[58] Field of Search .......... 395/650

[56] References Cited

U.S. PATENT DOCUMENTS 4,642,756 2/1987 Sherrod .......... 364/200

5,129,078 7/1992 Groves et al. .......... 395/550

*Primary Examiner*—Gareth D. Shaw

*Assistant Examiner*—A. Katbab

*Attorney, Agent, or Firm*—Robert T. Martin

[57] ABSTRACT

A stochastic priority based scheduler for selecting executable tasks in a computer system is disclosed. The stochastic priority based scheduler selects tasks on the basis of a random number weighted by task priority. Since every task has a nonzero finite probability of being selected, the probability being proportional to the task priority, all tasks, even low priority ones, have a chance of being selected, thus eliminating the lockout problem.

7 Claims, 5 Drawing Sheets

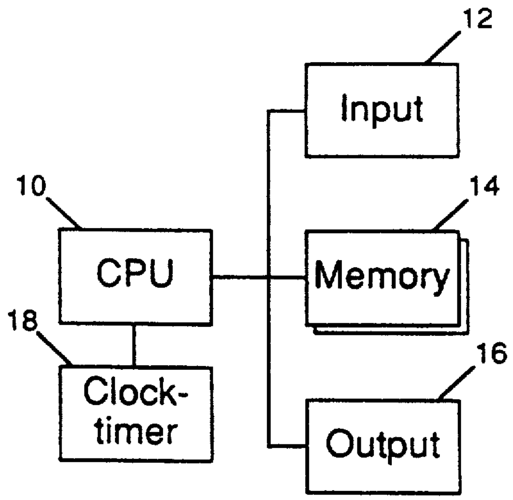
FIG.1 - PRIOR ART
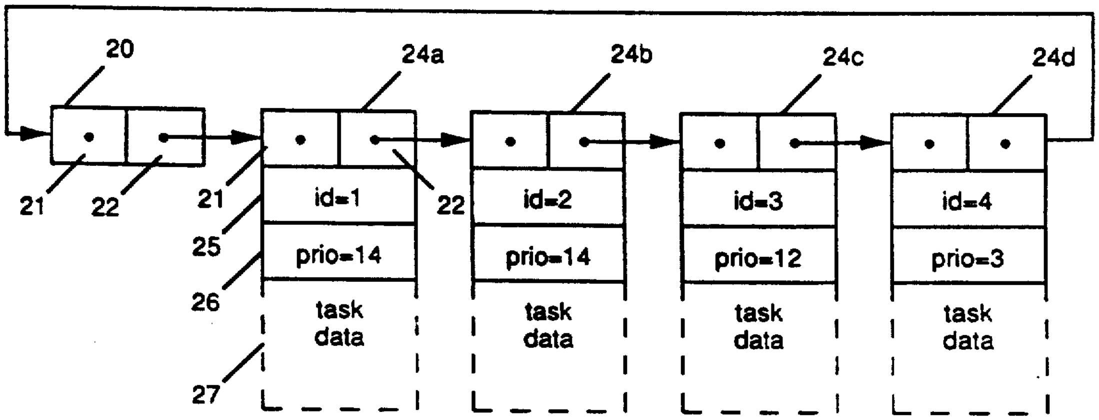
FIG.2 - PRIOR ART

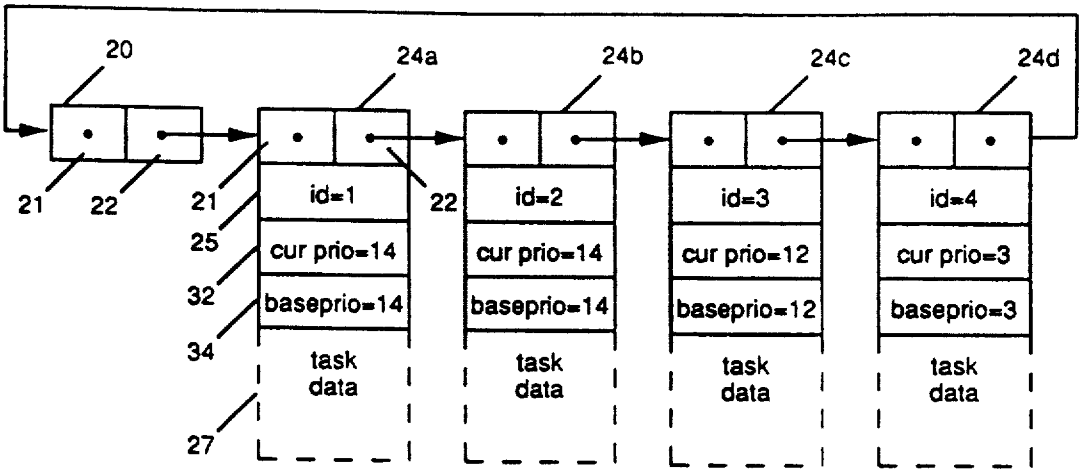
FIG.3 - PRIOR ART
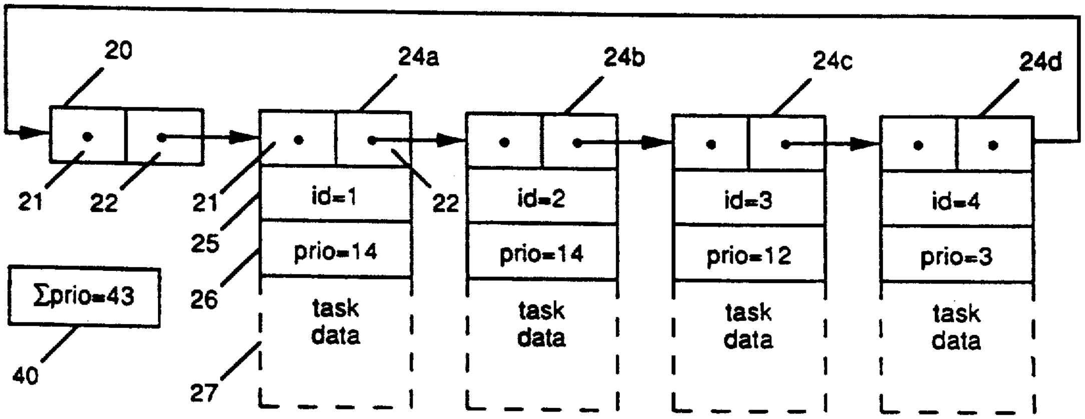
FIG. 4

```
lplot[list_, title_, asymptote_] :=
   Show[ListPlot[list, PlotJoined -> True, PlotRange -> {0,50},
               PlotLabel -> title],
     Plot[100 asymptote,{x,0,1000}, PlotRange -> {0,50}]
     ]
n=1000;
t1 = t2 = t3 = t4 = 0;
p1 = p2 = p3 = p4 = Table[0,{n}];
For[i=1,i<=n,i++,
     j=Random[Integer,{1,43}];
     If[1 <= j <= 14, t1++];
     If[15 <= j <= 28, t2++];
     If[29 <= j <= 40, t3++];
     If[41 <= j <= 43, t4++];
     p1[[i]]=100 t1/i; p2[[i]]=100 t2/i;
     p3[[i]]=100 t3/i; p4[[i]]=100 t4/i
     ];
lplot[p1,"Task 1: CPU use over time", 14/43];
lplot[p2,"Task 2: CPU use over time", 14/43];
lplot[p3,"Task 3: CPU use over time", 12/43];
lplot[p4,"Task 4: CPU use over time", 3/43]
```

*FIG. 6*

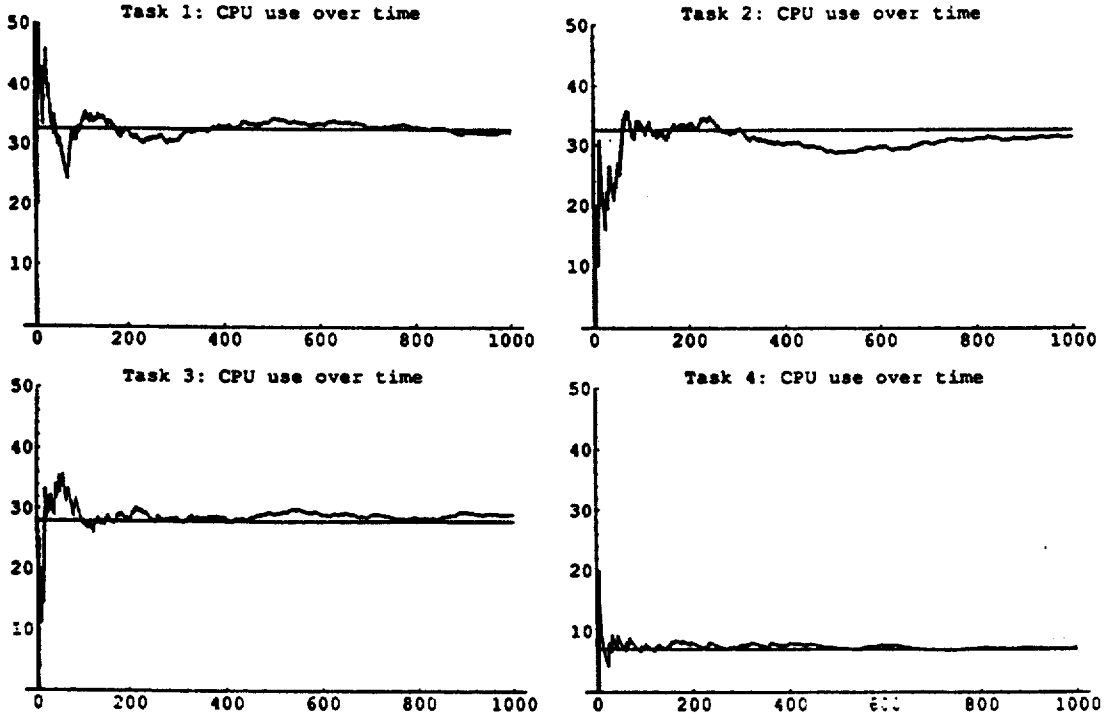

*FIG. 7*

STOCHASTIC PRIORITY-BASED TASK SCHEDULER

BACKGROUND OF THE INVENTION

This invention relates to the field of operating systems for digital computers, particularly digital computers wherein multiple tasks are scheduled for execution by one or more processors.

It is common in digital computers to have more than one task in a state ready for execution at the same time. In mainframe computers and minicomputers, these tasks can consist of batch processing jobs, users on a time-sharing system, and system tasks used for sending output to printers. Multitasking is now present in microcomputer and even hand-held computer based systems <<coverage>>. While the user of a microcomputer or hand-held computer system may only be aware of the primary task being directed by their actions, other tasks may be handling functions such as electronic mail, calendar services, handwriting recognition, and the like.

In multitasking environments, when there is more than one task that is ready for execution, the operating system must schedule the order in which tasks will be executed by one or more processors.

A known scheduling method associates priorities with each task; at each scheduling interval, the task with the highest priority is selected for execution. A problem with this priority based scheduling is that lower priority tasks will not execute as long as a higher priority task is available for execution; this problem is known as lockout. While there are modifications to priority scheduling (such as preemptive scheduling, and applying small increments in priority for a short period of time based on events, both explained below) these methods do not solve the lockout problem, and add to the complexity of the scheduling process.

BRIEF SUMMARY OF THE INVENTION

A preferred embodiment of the present invention presents a new priority based scheduling process that does not allow lockout to occur. Tasks are selected for execution stochastically on the basis of a random number weighted by task priority. Because every task has a finite nonzero probability of being selected, the probability being proportional to the task priority, the present invention has the advantage that all tasks, even low priority ones, have a chance of being selected, thus eliminating the lockout problem.

Other objects, features and advantages of the present invention will become more fully apparent from the following detailed description of the preferred embodiment, the appended claims and the accompanying drawings.

DESCRIPTION OF THE DRAWINGS

FIG. 1 is a block diagram of a typical computer system;

FIG. 2 shows the data structures for a priority based scheduling system (Prior Art);

FIG. 3 shows the data structures for a modified priority based scheduling system (Prior Art);

FIG. 4 shows the data structures in accordance with the present invention;

FIG. 6 is a model of the present invention;

FIG. 7 shows the performance of the model in FIG. 6; and

DETAILED DESCRIPTION OF THE INVENTION

Figure 5:
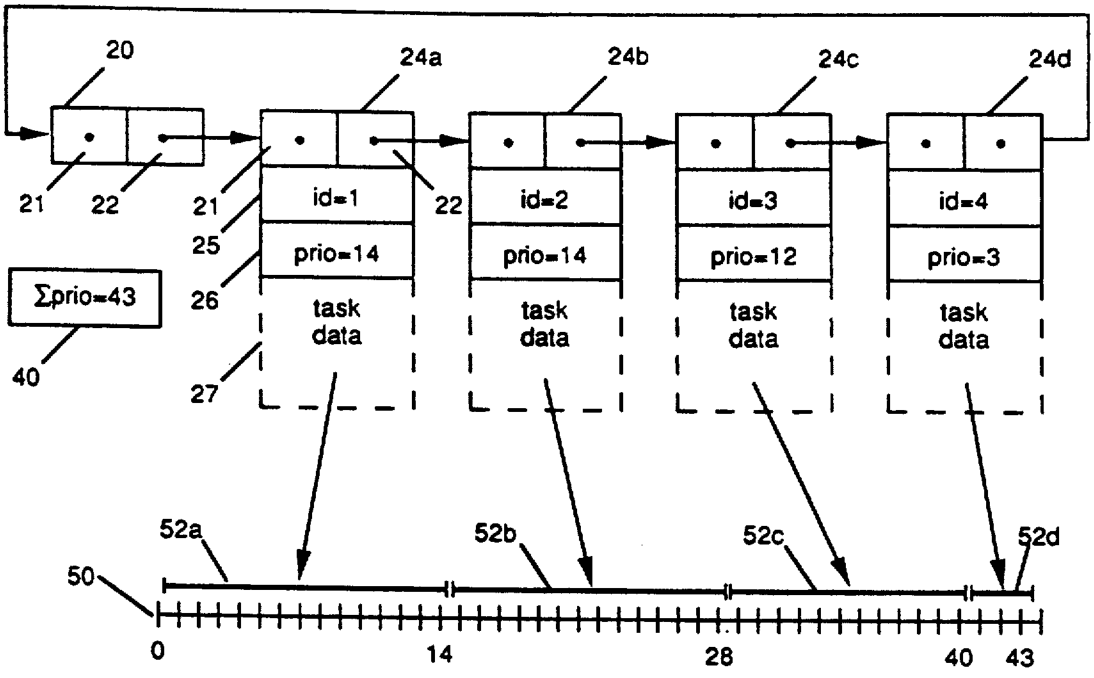
FIG. 5 shows a different representation of the present invention.

FIG. 1 is a block diagram of a typical computer based device or system. The system comprises a central processing unit (CPU) 10 interconnected with input devices 12, a memory hierarchy 14, output devices 16, and clock-timer 18. CPU 10 is responsible for executing instructions fetched from memory 14. A system may have one or more CPUs. In typical use, memory 14 is arranged in a hierarchy. Larger systems typically have read only memory (ROM), read write memory (RAM) and backing store usually in the form of disk drives. Smaller computers may only have ROM and RAM present, and may use plug in cards containing additional ROM or RAM for expansion. Clock-timer 18 provides a source of interrupts to the CPU.

In operation, CPU 10 fetches instructions from memory 14. By instructions fetched from memory, CPU 14 controls input devices 12, output devices 16, and manipulates data in memory 14. The operating system is a set of instructions and data structures that controls the operation of the computer system. The purpose of the operating system is to execute selected user tasks. The portion of the operating system that selects the task to be executed is known as the scheduler.

In a multitasking operating system, a task is a collection of instructions and data. The scheduling process deals with the manipulation and selection of tasks. In a simplified model, a task may be in one of two states, either active or blocked. The transition of a task from one state to the other is driven by events. An active task is ready to be executed by the CPU. A blocked task is not ready to be executed, and is waiting for some event to occur to return it to the active state. As an example, assume a first task is executing, processing data. The task makes an input request to the operating system for information needed to continue processing. The operating system initiates the input operation and calls the scheduler to change the state of the task from active to blocked. The scheduler selects a second task to run. When the input operation for the first task is completed, the scheduler changes the state of the first task from blocked to active again.

A simple known scheduler is the round-robin scheduler. This type of scheduler simply selects each active task in turn, giving each task equal weight. Lockout does not occur with round robin scheduling.. Scheduling may be initiated either as a result of the executing task making requests on the operating system, or scheduling may be initiated on the basis of timer interrupts at a regular rate.

Priority based scheduling is a known method that recognizes that some tasks are more important than others. For example, in a banking system, a task handling a data communications line to a banking terminal is more important and of a higher priority than a batch job processing checks; the customer at the banking terminal wants a rapid response, while background check processing is under no similar time constraint. In a traditional timesharing system having tasks representing multiple timesharing users, background batch jobs, and transferring data to printers, a high priority would be assigned to the timesharing users, who each want rapid response to entered requests, a lower priority assigned to the printer task which takes up little time, and lower priority assigned to the background batch tasks that can use the remaining available CPU time. In a personal computer system having tasks representing a main user activity such as word processing and background tasks such as printer control, remote data transfer, and electronic mail, the highest priority would be given to the word processing activity, and lower priorities given to the background tasks. The scheduler software keeps track of the tasks and selects the next task for execution.

Typically, the scheduler keeps a queue of active tasks, and a queue of blocked tasks. FIG. 2 is a representation of an active task queue for a priority based scheduler. The data structures shown in schematic fashion are well known to the art. Depending on the architecture of the processor used, these data structures could be organized as control blocks (shown), or organized as tables. The active task queue of FIG. 2 is shown using double linked lists. Active queue header 20 contains a back link 21 to the last element of the queue, and a forward link 22 to the first task queue block 24. Each task queue block 24 also contains a back link 21 to the previous element and a forward link 22 to the next element of the queue. For clarity, the forward links 22 are shown and the back links are omitted. Each task queue block 24 also contains a unique task id 25, used to identify the task to the operating system. Each task queue block 24 also contains a task priority 26. Task queue block 24 also contains additional task context data 27 required to suspend the execution of the task, switch to a different task, and later restore task execution as needed by the operating system and the CPU. Double linked lists allow the use of well known techniques for the efficient use in insertion, removal, and repositioning of entries in the queue.

With priority based scheduling, and an active task queue kept in priority order, the scheduler simply selects the first task in the active task queue for execution. In operation, a priority based scheduler using the information presented in FIG. 2 would place task 24a with id=1 and priority=14 into execution. This task would continue in execution until some event occurs which either raises the priority of another task above its level, lowers its priority below the priority of another task, or changes the task from the active to blocked state. Tasks 24b, 24c, and 24d are locked out and will not execute until some such event occurs.

There are two phases to the scheduling process. One phase involves the reporting of events, and the other involves task selection for execution. Reporting events results in changes to task priorities and states. Since these events may result in a change of task priorities, task selection for execution usually follows event reporting. The scheduling process may thus be viewed as being initiated by events. One class of events invoking the scheduling process are calls on the operating system.

For example, when a task makes an input request specifying that task execution be suspended until the input request is complete, scheduling is invoked to change the state of the task from active to blocked, and then to select an active task for execution.

Another class of events which invokes the scheduling process is input/output events, such as the completion of input/output operations and buffers becoming empty or full. For example, if a task is generating data very quickly and sending that data through an output buffer to a relatively slow output device, once the output buffer has become full the task is blocked until room is available in the output buffer, at which time the task can be made active again.

Another event used to invoke scheduling is a timer interrupt. The operating system enables a timer connected to the CPU to generate an interrupt in a certain period of time (e.g. 1/60 of a second) known as a time slice. When the interrupt occurs, the CPU stops executing its current task, and services the interrupt. As part of this interrupt servicing, the operating system invokes the scheduling process, which may result in the selection of a different task to be executed. This type of scheduling is called time sliced preemptive scheduling, because execution of the current task is preempted, and CPU time is allocated in slices. Conversely, a scheduler that allows the currently executing task to continue execution until that task causes some event resulting in the scheduling of another task is known as a non-preemptive scheduler.

Several modifications to the basic priority scheduling method have been made to address the lockout problem. Time-sliced preemptive scheduling is one of these.

In order to prevent lockout within a group of tasks of the same priority, round-robin scheduling is also employed. The rules of this method are very simple: 1) When a task is added, it is added at the head of its priority group, and 2) when a task completes a time slice, it is moved to the end of its priority group. For example, in the case shown by FIG. 2, task 24a with id=1 would be the first one executed. At the end of a given time slice, the round-robin method moves task 24a to the end of priority group 14 in the queue. In FIG. 2, task 24a would be rethreaded in the list after task 24b, leaving task 24b at the front of the queue for execution. At the end of the next time slice, these positions would be switched, and execution of task 24a would resume. Over successive time slices, tasks 24a and 24b would execute in turn. This approach does not solve the lockout problem; tasks 24c and 24d are still effectively locked out because of their lower priorities, and are not executed.

Another approach to the lockout problem is to apply small increments to task priorities for short intervals, based on events. This is shown in FIG. 3. In such a system, each task block 24 contains a current priority 32 and a base priority 34. As shown in FIG. 3, a round-robin preemptive scheduler as previously described would alternate execution between tasks 24a and 24b. The increment approach adds the following rules to the scheduling process: 1) At the end of a time slice, the priority 32 of the current task is decremented, but not allowed to fall below the current tasks' base priority 34. After decrementing the current priority, the task is then placed at the tail of the appropriate priority group, and 2) Each event reported to the scheduler has a priority increment associated with it, which may be zero. When an event is reported, this increment is added to the current priority of the task, and that task is repositioned in the queue at the head of the appropriate priority group.

Assume that an event is reported for task 24c with id=3, and this event carries with it a priority increment of 3. This would raise the current priority 32 of task 24c from 12 to 15, making task 24c the highest priority. The active task queue 20 would be rethreaded with task 24c at the front, followed by tasks 24a and 24b, so task 24c would be scheduled for execution. At the end of one time slice, the current priority 32 of task 24c would be decremented from 15 to 14 and rethreaded in the queue after tasks 24a and 24b which also have current priority 14. Task 24a would then be executed for one time slice. At the end of that time slice, task 24a's priority cannot be decremented, as that would fall below its base priority 34; task 24a is rethreaded behind tasks 24b and 24c, and task 24b is run. At the end of the next time slice, task 24b is rethreaded behind tasks 24c and 24a, and task 24c is now run. At the end of the next time slice, task 24c's current priority 32 is decremented from 14 to 13, and it is rethreaded after tasks 24a and 24b. Assuming no other events (other than preemptive timer events) are reported, tasks 24a and 24b will continue in execution, with tasks 24c and 24d once more locked out because of their lower current priorities.

The priority increment process adds complexity to the scheduling process. Priority increments must be assigned for each event, and small changes in these increments can dramatically affect system behavior and performance. Furthermore, the lockout problem is not solved by the priority increment process.

FIG. 4 shows schematically the data structures used by the first embodiment of the present invention. The present invention solves the lockout problem while preserving a priority based scheme by selecting tasks in a stochastic manner based on task priorities. Active queue header 20 is the head of a double linked list of task queue blocks 24. Each task queue block 24 contains a task id 25, a task priority 26, and task data 27. Variable Σprio 40 holds the sum of the task priorities 25 of all tasks in the active task queue. As the active task queue is modified by the insertion or removal of tasks, variable Σprio 40 is updated to reflect the sum of the task priorities 25 of all tasks in the active task queue. For the structures shown in FIG. 4, this value is 43. The scheduling process of the current invention generates a random integer in the range 1 to Σprio inclusive, here the range 1 to 43, and uses this integer to select the next task for execution.

A random integer can be conveniently and efficiently generated using well known methods and apparatus, such as a linear congruence pseudorandom sequence generator. Given the current integer value of the sequence is $r_n$, the next integer value in the sequence, $r_{n+1}$, is calculated as $r_{n+1}=(a*r_n) \bmod k$. Constant a and the initial seed value for the sequence must be carefully selected as is known in the art. The multiplication is done in a modular manner to the base k, usually related to a power of 2 for ease of computation. For example, $r_{n+1}=(16807*r_n) \bmod 2^{31}-1$ will produce a uniform sequence.

Given a random integer in the proper range, the active task queue is traversed summing task priorities until the summed priority is greater or equal to the generated value. The task that satisfies this condition during the traversal process is the one to be executed. The value Σprio can be maintained as tasks are added and removed from the task queue, or it can be regenerated during the scheduling process by making an additional pass through the queue and summing task priorities.

In the example shown in FIG. 4, assume the random integer generated for task selection is 33. Traversing the task queue starts with task 24a. The sum of task priorities at this point is 14, and since 14 is less than 33, task 24a is not selected. Moving to the next task, 24b, the sum of priorities is 28 (14+14), which is less than 33, so task 24b is not selected. Moving to the next task, 24c, the sum of priorities is 40 (14+14+12), which is greater than 33 so task 24c is selected for execution.

Alternatively, rather than traversing the task queue and adding up task priorities, the task queue can be traversed decrementing the random integer by the current task priority and testing for zero. On many computers it is more efficient to test a value to see if it is less than or equal to zero. In this traversal method, using FIG. 4, assume the random integer generated for task selection is 33. Traversing the task queue starts with task 24a. The priority of the task, 14, is subtracted from the task selection value, 33. The remainder is 19, which is stored back as the task selection value. Since this value is greater than zero, traversal continues with task 24b. The priority of task 24b is 14, which is subtracted from 19, leaving a remainder of 5. Since 5 is greater than zero, traversal continues with task 24c. The priority of task 24c is 12, which is subtracted from 5, leaving a remainder of −7. Since −7 is less than zero, task 24c is selected for execution.

FIG. 5 illustrates the behavior of the present invention in a graphic form. Because the output of a well designed pseudorandom sequence generator is statistically uniform, over time all integer values from 1 to 43 will appear and with similar frequency, and all of the given tasks will therefore be chosen for execution. The probability of any given task being chosen is proportional to that tasks' priority. In FIG. 5, number line 50 shows the integers from 0 to Σprio (the sum of active task priorities) here the range 0 to 43. Also shown are the spans of each task, each span equal to the tasks' priority. Task 24a with priority 14 has associated with it span 52a, covering from 1 to 14. Task 24b with priority 14 has span 52b, covering from 15 to 28. Task 24c with priority 12 has span 52c, covering from 29 to 40. Task 24d with priority 3 has span 52d, covering from 41 to 43. A generated random integer in the range 1 to 14 will select task 24a, in the range 25 to 28 task 24b, in the range 29 to 40 task 24c, and in the range 41 to 43 task 24d. Over time, the amount of CPU time a task executes will be proportional to its priority, with no tasks locked out. In the limit as time increases, the amount of CPU time a task executes approaches the task priority divided by Σprio. In FIG. 5, Σprio has the value 43. The amount of CPU time task 24a with priority 14 executes approaches 14/43, approximately 32.6%. The amount of CPU time task 24b with priority 14 executes approaches 14/43, approximately 32.6%. The amount of CPU time task 24c with priority 12 executes approaches 12/43, approximately 27.9%. The amount of CPU time task 24d with priority 3 executes approaches 3/43, approximately 7%.

FIG. 6 is a model of the present invention using the parameters of FIG. 5. The model is written in the language *Mathematica*, published by Wolfram Research, Inc., which is available on many computer systems including the Apple Macintosh. FIG. 7 shows the output of this model as run on an Apple Macintosh II, and demonstrates its performance.

Referring first to FIG. 6, the line numbers to the left of the vertical bar are for reference only and are not part of the model. Lines 1 through 5 define a graphing function lplot. This function takes as arguments a list of the points to plot, the graph title, and the value of the asymptote line to plot. Line 6 defines variable n as the number of sample points to accumulate, here 1000. Line 7 defines variables t1, t2, t3, and t4, and initializes them to zero. Variable t1 contains the number of times task 1 is selected. Variable t2 contains the number of times task 2 is selected. Variable t3 contains the number of times task 3 is selected. Variable t4 contains the number of times task 4 is selected. Line 8 initializes four lists, p1, p2, p3, and p4, used to hold the plot data. Line 9 begins a loop that is repeated for each sample point. Line 10 assigns to variable j a random integer in the range 1 to 43 inclusive. Lines 11 through 14 count the number of times each task is selected based on the random integer in variable j. Referring also to FIG. 5, when the random integer j is in the range 1 to 14, task 1, marked 24a in FIG. 5, is selected, and variable t1 is incremented to reflect this selection. Lines 15 and 16 compute the percentage of time each task has executed for use in the graphs of FIG. 7. The percentage of time for each data point is equal to the number of times the task has been selected, held in variables t1, t2, t3, and t4, divided by the sample number, i. Lines 18 through 21 produce the graphs shown in FIG. 7.

FIG. 7 graphs the performance of the present invention as molded by FIG. 6, showing the percentage of CPU time used by each task over time. As shown in the graph for Task 1 with priority 14, the CPU time rapidly approaches the calculated value of 32.7%, which is shown as the solid horizontal line in the graph. Similarly, Task 2 also with priority 14 rapidly approaches 32.7%, Task 3 with priority 12 rapidly approaches 27.9%, and Task 4 with priority 3 rapidly approaches 7% CPU use over time. These graphs show that the present invention schedules tasks on a priority basis, and does not lock out low priority tasks.

Figure 8:
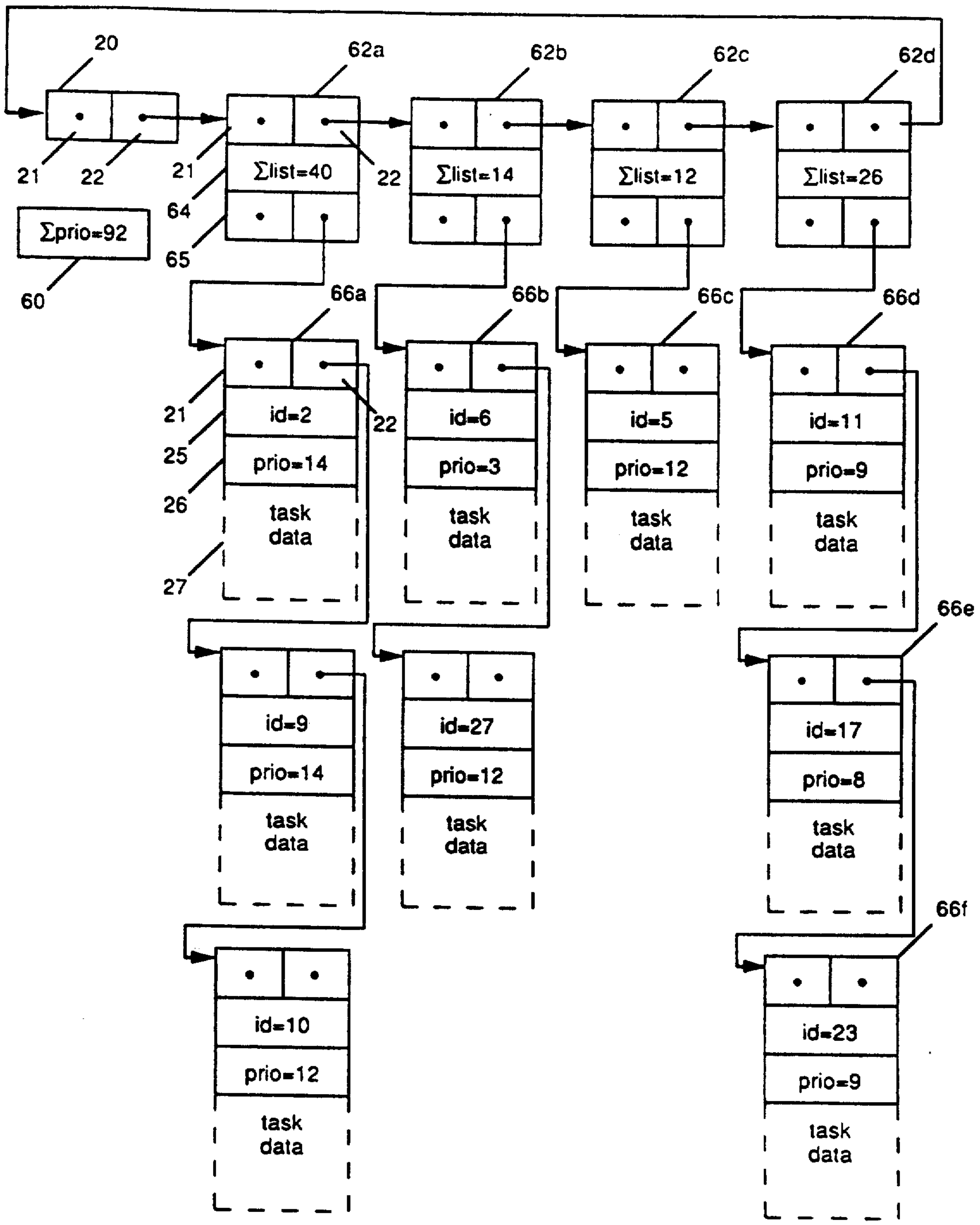
FIG. 8 shows a second embodiment of the present invention.

The embodiment of FIG. 5 requires a linear search of the active task queue to make a selection. This linear search can become time consuming if a large number of tasks are present in the queue. FIG. 8 shows a second embodiment of the present invention that reduces the time required for queue traversal when there are many tasks in the queue. Rather than having all active tasks threaded together to active queue header 20 in one linear list, tasks are grouped into subqueues, each having a subqueue header 62. Each subqueue header 62 contains a cell Σlist 64, which is the sum of priorities for all tasks in the subqueue. Subqueue header 64 also contains a task queue header 65 containing forward and back links to each of the task queue blocks 66. For clarity of the diagram, only the forward links are shown. The sum of all Σlist 64 cells is kept as Σprio 60, the sum of all task priorities. Tasks need not be in any particular order in the subqueues In the embodiment of FIG. 8, the process of traversal is faster than in the embodiment of FIG. 5, as in FIG. 8 the subqueue headers 62 are traversed to first select a subqueue meeting the scheduling criteria, and then traversing that subqueue to select the particular task queue block 66, rather than traversing all the task queue blocks 24 of FIG. 5 to reach the selected task.

For example in FIG. 8, assume the random integer generated for task selection is 81. Traversal starts with subqueue header 62a. The sum of priorities at this point is 40, and because 40 is less than 81, the task to be selected is not in subqueue 62a. Moving to the next subqueue header 62b, the sum of priorities is 54 (40+14), which is less than 81, so the task to be selected is not in subqueue 62b. Moving to the next subqueue header 62c, the sum of priorities is 66 (40+14+12), which is less than 81, so the task to be selected is not in subqueue 62c. Moving to the next subqueue header 62d, the sum of priorities is 92 (40+14+12+26), which is greater than 81, so the task to be selected is in subqueue 62d. Traversing task queue header 65 in subqueue header block 62d leads to task queue block 66d. The sum of priorities at this point is 75 (40+14+12+9), which is less than 81, so task 66d is not selected for execution. Moving to task queue block 66e, the sum of priorities is 82 (40+14+12+9+8), which is greater than 81, so task 66e is selected for execution.

A variation on FIG. 8 would be to keep a count in subqueue header 62 of the number of tasks linked to that subqueue header. This allows for specific coding to handle the case where there is only one task queue block 66 linked to the subqueue header 62, as shown by task queue block 66c and subqueue header block 62c. It would also simplify the process of adding new tasks to the shortest subqueue.

The invention as disclosed provides a priority-based scheduler that eliminates the lockout problem. Addition advantages of the invention include simplified queue management. Tasks do not have to be added in priority order or kept in priority order. Because task priorities to not change, tasks do not have to be rethreaded in new priority positions within the queue.

While the invention has been described with reference to computer systems, the invention may be applied to any computer operated device wherein multiple tasks must be scheduled for execution. While the invention has been described with reference to specific embodiments, it will be understood by those in the art that various changes may be made and equivalents may be substituted for elements thereof without departing from the true spirit and scope of the invention. In addition, many modifications may be made without departing from the essential techniques of this invention.

What is claimed is:

1. In a computer system wherein a plurality of executable tasks are available for execution, a task selection method comprising the steps of:
   - maintaining a data structure containing the plurality of executable tasks;
   - associating a priority with each of the executable tasks; and
   - selecting a task at random weighted by a task priority from the data structure of executable tasks.

2. The task selection method of claim 1 wherein the step of selecting a task at random weighted by a task priority further comprises:
   - calculating the sum of the priorities for all executable tasks;
   - generating a random selection value between 1 and the sum of the priorities;
   - initializing a temporary variable to zero;
   - traversing the data structure of executable tasks by adding the task priority to the temporary variable, comparing the temporary variable to the random selection value, and moving to the next task in the data structure if the temporary variable is less than the selection value; and
   - selecting the task that resulted in the temporary variable being equal or greater than the selection value as the executable task.

3. The task selection method of claim 2 wherein the data structure of executable tasks is kept as a linked list.

4. The task selection method of claim 2 wherein the data structure of executable tasks is kept as a set of indexed tables.

5. The task selection method of claim 1 wherein the step of selecting a task at random weighted by task priority further comprises:

calculating the sum of the priorities for all executable tasks;

generating a random selection value between 1 and the sum of the priorities;

traversing the data structure of executable tasks by subtracting the task priority from the selection value, and moving to the next task in the data structure if the selection value is greater than zero; and selecting the task that resulted in the selection value being less than or equal to zero.

6. The task selection method of claim 5 wherein the data structure of executable tasks is kept as a linked list.

7. The task selection method of claim 5 wherein the data structure of executable tasks is kept as a set of indexed tables.

* * * * *